Nov. 25, 1947. W. H. BROWN 2,431,633
FLEXIBLE TUBING CONNECTION
Filed Aug. 28, 1946
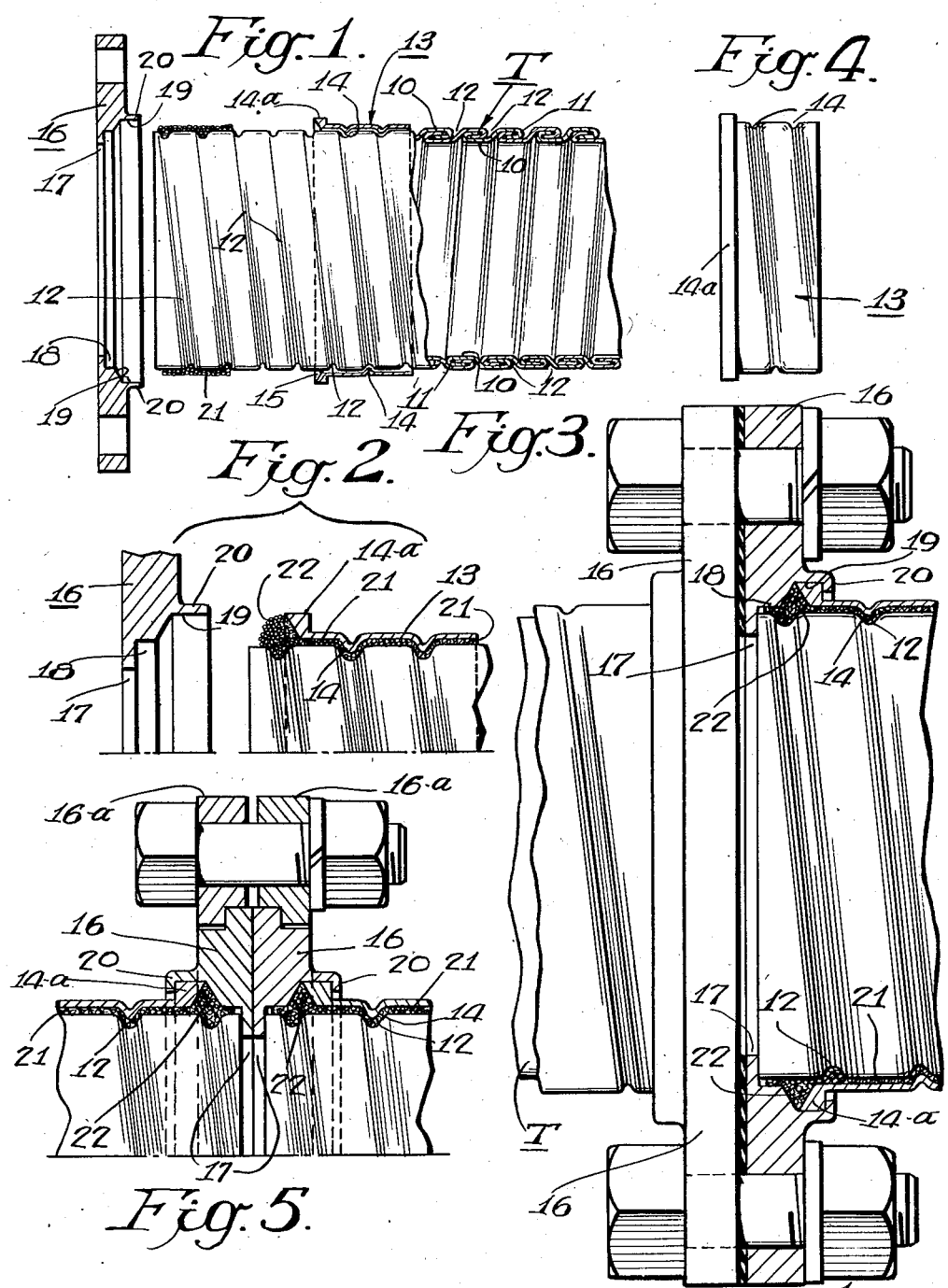
Inventor:—
William H. Brown
by his Attorneys
Howson + Howson Patented Nov. 25, 1947

2,431,633

UNITED STATES PATENT OFFICE 2,431,633

FLEXIBLE TUBING CONNECTION

William H. Brown, Kennett Square, Pa., assignor to Pennsylvania Flexible Metallic Tubing Company, Philadelphia, Pa., a corporation of Pennsylvania Application August 28, 1946, Serial No. 693,487

4 Claims. (Cl. 285—138)

This invention relates to joints for flexible tubing and in generally to joints for that type of flexible tubing wherein spirally locked strips of metal are employed in the construction of the tubing.

In such tubing the provision of connecting joints is difficult due to the fact that the metal employed in the construction of the tubing is relatively thin and due to the fact that the method of forming such tubing leads to the formation at the exterior of the tubing of a spiral groove which is ordinarily extremely difficult to pack.

An important object of the invention is the provision of a simple and sufficient coupling element for use on such tubing and which will provide means whereby the tubing may be very firmly and completely packed, both at the groove and at its external structure and which may be very readily applied to the tubing.

Another and more specific object of the invention is the provision of a packing connection for use with flexible tubing in which a follower element is provided which is so constructed that it will serve to force the packing into the groove and provide a perfect seal therealong.

These and other objects I attain by the construction shown in the accompanying drawings wherein, for the purpose of illustration, I have shown a preferred embodiment of my invention and wherein:

Figs. 1 and 2 are views partially in longitudinal section illustrating consecutive steps in the assembly of a joint in accordance with my invention;

Fig. 3 is an enlarged section showing the completed joint;

Fig. 4 is an elevation of the packing collar; and

Fig. 5 is a sectional view showing a somewhat modified construction.

Referring now more particularly to the drawings, the tubing T comprises a spirally wound metallic strip 10, such strips being automatically offset intermediate their ends and the spiral turns thereof reverted at their edges and interlocked as indicated at 11. This results in the formation of a spiral groove 12 at the exterior of the tubing. In accordance with my invention, I provide a collar 13 which is constructed to fit somewhat loosely upon the exterior of the tubing T and which has an internal rib 14 fitting somewhat loosely in, and having a pitch corresponding to, the spiral groove 12. The end of collar is preferably somewhat enlarged as at 14A and dished as at 15 on its end face after the manner of constructing an ordinary gland follower.

In combination with this collar, I provide a flange ring 16 having an opening 17 of the approximate size of the bore of the tubing T and having surrounding this bore a socket 18 to receive the end of the tubing and a succeeding enlargement of this socket at 19 to form a second socket receiving the enlarged end of the collar 13. Preferably, this latter socket is defined by an upstanding rib 20 on the flange ring for a purpose hereinafter to appear.

The steps in applying a coupling element of this character to the tubing are illustrated in Figs. 1, 2, and 3. The collar 13 is first applied and screwed back upon the tubing for a sufficient distance to expose a considerable area thereof beyond the gland end of the follower. Packing 21 of the type generally known as string packing is then spirally wound upon the exposed end of the tubing and in this winding, is laid to a depth somewhat greater than the clearance between the collar and tubing. Following this, the collar 13 is screwed forwardly toward the end of the tubing. During this step a portion of the packing becomes compressed between the wall of the tubing and the opposed wall of the collar and between the wall of the rib 14 and the walls of the groove 12. The remainder of the packing is crowded ahead of the gland end of the collar forming a mass as indicated at 22 in Fig 2. The flange ring of the coupling is then placed over the end of the tubing and in the present illustration the flange 20 of the flange ring is rolled or pressed back of the head 14A thereby compressing the wadded packing 22 and forming a tight seal between the ring 16 and collar 13.

Obviously, the flange ring 16 may be either an integral part of the flange proper as shown or may be a part 16A in swivel engagement therewith as suggested in Fig. 5. The collar proper may be formed of relatively thin metal and under these circumstances the formation of the internal rib 14 may be accomplished by rolling the collar wall as shown.

Since the construction is obviously capable of considerable modification, I do not wish to be limiting myself thereto except as hereinafter claimed.

I claim:

1. A joint for flexible metallic tubing of a type in which spirally wound strips are interlocked and the exterior of the tube has a spiral groove, said joint comprising a follower collar having a loose fit upon the tubing and an internal rib having the same pitch as the groove and engaged therein, a flange ring having an opening for alinement with the bore of the tubing and about said bore a socket receiving the end of the tubing wall and a socket to receive the end of the collar, a connection between said ring and collar and packing compressed between the ring and collar and between said collar and tubing including the walls of groove of the tubing.

2. A joint for flexible metallic tubing of a type in which spirally wound strips are interlocked and the exterior of the tube has a spiral groove, said joint comprising a follower collar having a loose fit upon the tubing and an internal rib having the same pitch as the groove and engaged therein, a flange ring having an opening for alinement with the bore of the tubing and about said bore a socket receiving the end of the tubing wall and a socket to receive the end of the collar, the last-named socket being defined by an upstanding flange, a head on collar behind which the extremity of the flange is solidly engaged, a packing compressed between the ring and collar and between said collar and tubing including the walls of groove of the tubing.

3. A joint for flexible metallic tubing of a type in which spirally wound strips are interlocked and the exterior of the tube has a spiral groove, said joint comprising a follower collar having a loose fit upon the tubing and an internal rib having the same pitch as the groove and engaged therein, a flange ring having an opening for alinement with the bore of the tubing and about said bore a socket receiving the end of the tubing wall and a socket to receive the end of the collar, a connection between said ring and collar and packing compressed between the ring and collar and between said collar and tubing including the walls of groove of the tubing, said collar receiving socket and the opposed end of the collar being formed as elements of a packing gland.

4. A joint for flexible metallic tubing of a type in which spirally wound strips are interlocked and the exterior of the tube has a spiral groove, said joint comprising a follower collar having a loose fit upon the tubing and an internal rib having the same pitch as the groove and engaged therein, a flange ring having an opening for alinement with the bore of the tubing and about said bore a socket receiving the end of the tubing wall and a socket to receive the end of the collar, the last-named socket being defined by an upstanding flange, a head on collar behind which the extremity of the flange is solidly engaged, a packing compressed between the ring and collar and between said collar and tubing including the walls of groove of the tubing, said collar receiving socket and the opposed end of the collar being formed as elements of a packing gland.

WILLIAM H. BROWN.